United States Patent
SP et al.

(10) Patent No.: US 9,824,070 B1
(45) Date of Patent: Nov. 21, 2017

(54) CONTEXTUAL ANCHOR POINTS IN CONTENT

(71) Applicant: Amazon Technologies, Inc., Reno, NV (US)

(72) Inventors: Pranap SP, Tamil Nadu (IN); Venkata Krishnan Ramamoorthy, Tamil Nadu (IN)

(73) Assignee: Amazon Technologies, Inc., Reno, NV (US)

( * ) Notice: Subject to any disclaimer, the term of this patent is extended or adjusted under 35 U.S.C. 154(b) by 578 days.

(21) Appl. No.: 14/023,105

(22) Filed: Sep. 10, 2013

(51) Int. Cl.
| G06F 17/22 | (2006.01) |
| G06F 17/24 | (2006.01) |
| G06F 3/048 | (2013.01) |
| G06F 3/02  | (2006.01) |
| G06F 17/21 | (2006.01) |

(52) U.S. Cl.
CPC .................... G06F 17/21 (2013.01)

(58) Field of Classification Search
CPC ........... G06F 17/2235; G06F 17/30887; G06F 17/30882; G06F 17/3089; G06F 17/24; G06F 17/2229; G06F 17/30864; G06F 17/211
See application file for complete search history.

(56) References Cited

U.S. PATENT DOCUMENTS

| 6,122,647 A * | 9/2000 | Horowitz ......... G06F 17/30873 |
| | | 707/999.003 |
| 7,458,014 B1 * | 11/2008 | Rubin .................. G06F 3/0488 |
| | | 709/206 |
| 2003/0037303 A1 * | 2/2003 | Bodlaender ......... G06F 17/2247 |
| | | 715/236 |
| 2007/0136680 A1 * | 6/2007 | Skrenta ............. G06F 17/30056 |
| | | 715/780 |
| 2011/0087955 A1 * | 4/2011 | Ho ........................ G06F 17/211 |
| | | 715/230 |

(Continued)

OTHER PUBLICATIONS

Kaufman (Learn How to Use the Navigation Pane in Microsoft Word, published Oct. 10, 2011, pp. 1-14).*

(Continued)

*Primary Examiner* — Stephen Hong
*Assistant Examiner* — Ahamed I Nazar
(74) *Attorney, Agent, or Firm* — Eversheds Sutherland (US) LLP (57) ABSTRACT

This disclosure describes systems, methods, and computer-readable media related to contextual anchor points in content. In some embodiments, processed content may be received from a server. Contextual anchor parameters may be received from a user. A selection of an anchor target in the processed content may be received from a user. One or more contextual anchor candidates may be identified in the processed content based at least in part on the anchor target and the one or more contextual anchor parameters. The one or more contextual anchor candidates and at least a portion of the processed content may be displayed to the user. A selection of at least one contextual anchor from the one or more contextual anchor candidates may be received from the user. An association may be established between the anchor target and the contextual anchor. The processed content, anchor target, and the association may be transmitted.

20 Claims, 6 Drawing Sheets

(56) References Cited

U.S. PATENT DOCUMENTS

| | | | |
|---|---|---|---|
| 2011/0179350 A1* | 7/2011 | Capela | G06F 17/211 |
| | | | 715/244 |
| 2012/0210203 A1* | 8/2012 | Kandekar | G06F 17/30719 |
| | | | 715/230 |
| 2012/0233539 A1* | 9/2012 | Reed | G06F 3/0488 |
| | | | 715/234 |
| 2015/0058358 A1* | 2/2015 | Xu | H04L 67/10 |
| | | | 707/748 |

OTHER PUBLICATIONS

Johnson (Ebook hyperlink editor, published Nov. 13, 2003, pp. 1-5).*

Johnson (WO 2003094040 A1, Ebook Hyperlink Editor, published Nov. 13, 2003, pp. 1-5).*

* cited by examiner

CONTEXTUAL ANCHOR POINTS IN CONTENT

BACKGROUND

Electronic books (also called "e-books") are digital publications which may include text, images, and the like. E-books are becoming more prevalent and available on different types of devices, such as electronic readers (also called "e-readers"), smartphones, tablets, laptops, and the like. E-books, as well as other electronic content, may be rendered on the different types of devices. Because the different devices have different screen sizes, an e-book may appear differently across the different types of devices. For example, the different screen sizes may affect the pagination of an e-book, where the same e-book may be rendered so that a smaller device, such as a smartphone, may need to render more pages of the e-book than a tablet. This may result in inconvenient or cumbersome consumer experience.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

E-books and other digital content are available for viewing on many different types of devices which may have different screen sizes. Some e-books and digital content (e.g., electronic textbooks, scholarly articles, technical papers, magazines, newspapers, etc.) may contain elements, such as images or tables, where it may be beneficial to render the elements in proximity to each other or associated text. For example, an e-book may contain an image and a caption. In some cases, when the e-book is rendered on a device, the image and caption may be rendered on different pages, making it difficult for the user to easily see the association of the elements. This disclosure relates to, among other things, systems, methods, computer-readable media, techniques and methodologies for contextual anchor points in content.

In some embodiments, content may be provided to a publisher or distributor. The content may be provided in the form of a word processing document, a portable document format (PDF), a text document, an HTML document, a scanned image (e.g., a scanned image of a book) or the like. For example, content may be provided in the form of a scanned PDF or image of a book. A server may process the scanned PDF or image and extract data. The content may then be processed into an intermediate format that may be more easily manipulated and reviewed by a user. The content may be automatically converted to the intermediate format and then presented to a user for review. The user may review the content in the intermediate format on a content authoring device, such as a desktop computer or tablet, and may make edits to the content. Once the content has been reviewed, the content may be transmitted to the content authoring device for identification and establishment of contextual anchor points. Contextual anchor points may be the association of two or more elements in an e-book or digital content that should be rendered in proximity to each other. In some embodiments, the content may be available for the identification and establishing of contextual anchor points through a web interface, where the user is able to interact with the content through the web interface but the processing of the content occurs on a remote server.

A content authoring device may receive the processed content in the intermediate format. The content authoring device may then render one or more visual user interface (UI) controls, such as a slider, radio buttons, checkboxes, or the like. In some embodiments, the content authoring device may provide a heuristic-based visual UI control to establish an association between an anchor target and a contextual anchor selected from one or more contextual anchor candidates. An anchor target may be an element identified by the content authoring device and confirmed by a user or selected by a user. Contextual anchor candidates are elements that may have been identified by the content authoring device as possibly related to the anchor target in the content. The user may indicate one or more contextual anchor parameters, such as an approximate distance from an identified anchor target. For example, a user may specify a contextual anchor parameter as fifty words from a specified anchor target. The content authoring device may then identify all contextual anchor candidates within fifty words from the specified anchor target.

A user may interact with a UI provided by the content authoring device to specify an anchor target, such as by right-clicking on an element and selecting an option to set the element as the anchor target. The user may interact with the one or more visual UI controls to specify one or more contextual anchor parameters. The content authoring device may then identify all the contextual anchor candidates in the content based at least in part on the one or more contextual anchor parameters and present them to the user. By limiting the presentation of the contextual anchor candidates based at least in part on the contextual anchor parameters, the content authoring device may reduce the visual noise presented to the user to enable a better user experience.

The content authoring device may present the contextual anchor candidates to the user through visual indicators, such as highlighting the element, underlining the element, associating the contextual anchor candidate with an icon, or the like. The user may then select one or more contextual anchors from the contextual anchor candidates through the UI. The content authoring device may then establish an association between the anchor target and the selected contextual anchor.

The content authoring device may then transmit the processed content and additional data, including the association between the anchor target and the selected contextual anchor to a content processing server. The content processing server may then apply one or more templates to the processed content. The templates may be formatted based at least in part for specific devices, screen sizes, type of content, or the like. The content processing server may then process the content and the associations between the anchor targets and the selected contextual anchors into a final format. The content authoring device may transmit the processed content in final format to a datastore.

Users may operate user devices, such as e-readers and mobile devices, to obtain and/or receive the processed content in final format from the datastore. The user devices may render the processed content in final format to the users, where the anchor targets and contextual anchors enable elements to be rendered in close proximity to each other.

Illustrative Use Cases and System Architecture

Figure 1:
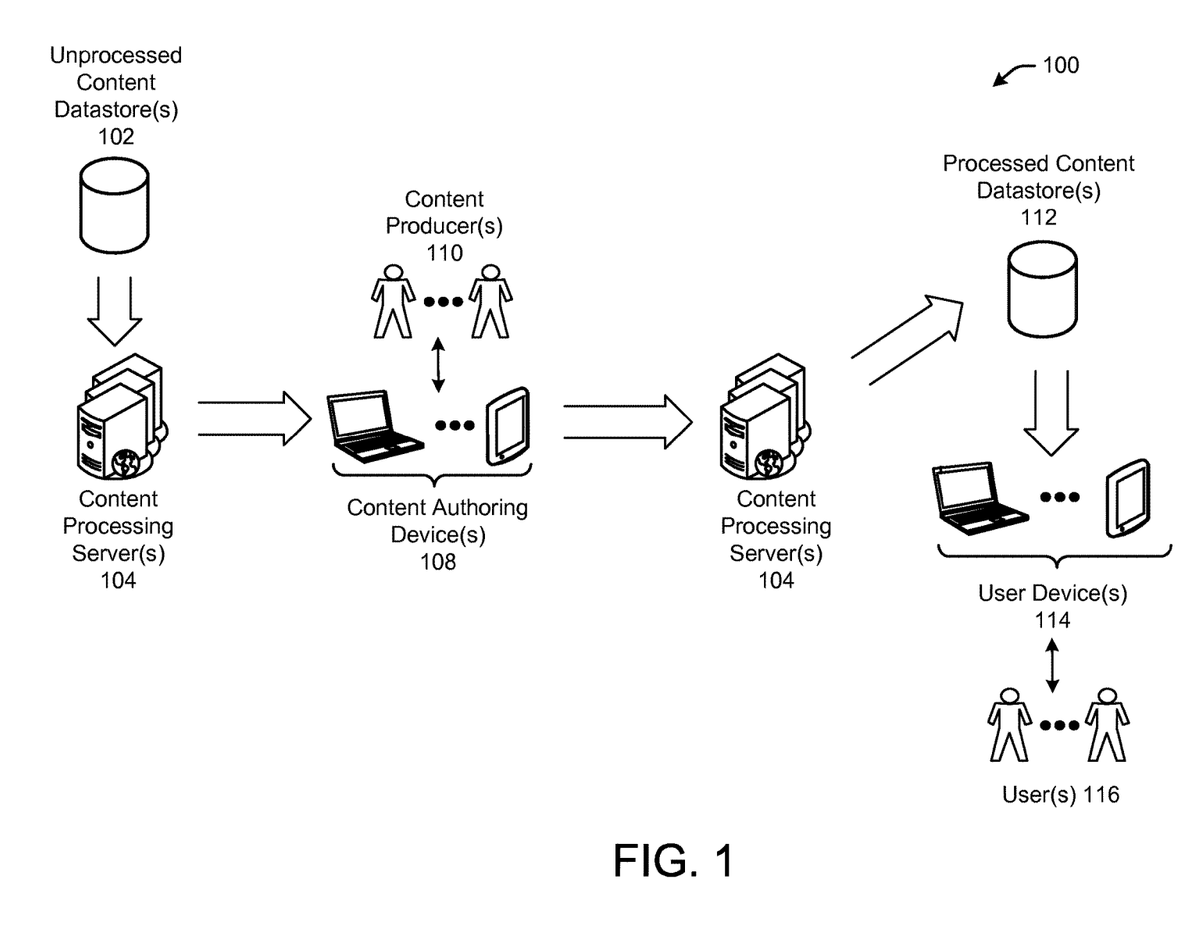
FIG. 1 depicts an illustrative data flow between various components of an illustrative system architecture for contextual anchor points in content in accordance with one or more embodiments of the disclosure.

FIG. 1 depicts an illustrative data flow 100 between various components of an illustrative system architecture for anchor targets and contextual anchors in content in accordance with one or more embodiments of the disclosure. One or more illustrative content processing server(s) 104 are illustratively depicted in FIG. 1. The content processing server(s) 104 may include any suitable device capable of receiving and/or retrieving content from one or more unprocessed content datastore(s) 102 and processing the unprocessed content. The content processing server 104 may include any suitable processor-driven computing device including, but not limited to, a desktop computing device, a laptop computing device, a server, and so forth. For ease of explanation, the content processing server(s) 104 may be described herein in the singular; however, it should be appreciated that multiple content processing servers 104 may be provided.

The content processing server 104 may receive and/or retrieve unprocessed content and automatically convert the content into an intermediate format. The content processing server 104 may facilitate updates and corrections to the processed content in the intermediate format. In some embodiments, the updates and corrections to the processed content may be received from one or more content producers 110 by the content processing server 104 and/or a content authoring device 108. The content processing server 104 may then transmit the processed content in the intermediate format to one or more content authoring device(s) 108.

One or more content authoring device(s) 108 operable by one or more content producer(s) 110 may receive the processed content in the intermediate format. The content authoring device(s) 108 may include any suitable device capable of receiving and processing content in the intermediate format and establishing associations between one or more anchor targets and one or more contextual anchors selected from one or more contextual anchor candidates. The content authoring device(s) 108 may include any suitable processor-driven computing device including, but not limited to, a smartphone or other cellular device, a tablet device, an electronic reader device, a desktop computing device, a laptop computing device, a gaming console, a multimedia content streaming device, a set-top box, and so forth. For ease of explanation, the content authoring device(s) 108 and the content producer(s) 110 may be described herein in the singular; however, it should be appreciated that multiple content authoring device(s) 108 operable by multiple content producer(s) 110 may be provided. The content authoring device(s) 108 may transmit the processed content in the intermediate format and established associations between one or more anchor targets and one or more contextual anchors selected from one or more contextual anchor candidates to one or more content processing server(s) 104. The content processing server(s) 104 may further process the received data (e.g., processed content in the intermediate format and established associations between one or more anchor targets and one or more contextual anchors) into a final format and transmit the processed content in final format to one or more processed content datastore(s) 112 for storage. In some embodiments, the content processing server(s) 104 may format the processed content using one or more pre-determined templates. The pre-determined templates may be formatted based at least in part for specific devices, screen sizes, type of content, or the like.

One or more user device(s) 114 operable by one or more user(s) 116 may retrieve and/or receive the processed content in final format from one or more processed content datastore(s) 112. The user device(s) 114 may include any suitable device capable of receiving and/or retrieving processed content from one or more processed content datastore(s) 112 and presenting the processed content in final format to one or more user(s) 116. The user device(s) 114 may include any suitable processor-driven computing device including, but not limited to, a smartphone or other cellular device, a tablet device, an electronic reader device, a desktop computing device, a laptop computing device, a gaming console, a multimedia content streaming device, a set-top box, and so forth. For ease of explanation, the user device(s) 114 and user(s) 116 may be described herein in the singular; however, it should be appreciated that multiple user device(s) 114 and multiple user(s) 116 may be provided.

Figure 2:
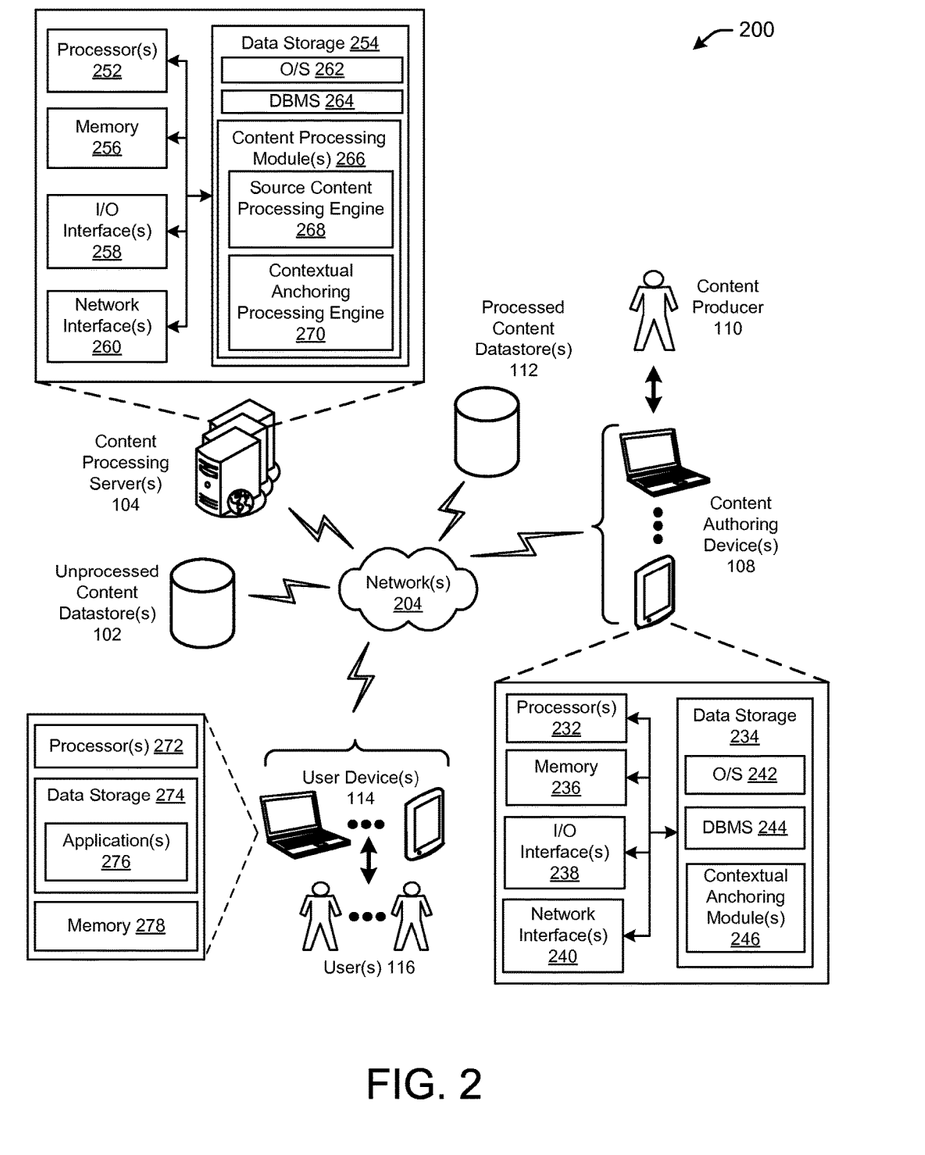
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more content authoring device(s) 108 operable by one or more content producer(s) 110, one or more content processing server(s) 104, one or more unprocessed content datastore(s) 102, one or more processed content datastore(s) 112, and/or one or more user device(s) 114 operable by one or more user(s) 116. The user device(s) 114 may include any of the types of devices described through reference to FIG. 1.

Any of the content authoring device(s) 108, content processing server(s) 104, user device(s) 114, unprocessed content datastore(s) 102 and/or processed content datastore(s) 112 may be configured to communicate with each other and any other component of the architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The content processing server 104 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from data storage 254 and loaded into memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into memory 256 as needed for execution. Depending on the configuration and implementation of the content processing server 104, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The content processing server 104 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The content processing server 104 may further include network interface(s) 260 that facilitate communication between the content processing server 104 and other devices of the illustrative system architecture 200 (e.g., content authoring device(s) 108 or one or more datastore(s) 102, 112) or application software via the network(s) 204. The content processing server 104 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like, may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the content processing server 104 and the hardware resources of the content processing server 104. More specifically, the O/S 262 may include a set of computer-executable instructions for managing the hardware resources of the content processing server 104 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores (e.g., unprocessed content datastore 102, processed content datastore 112). For example, the DBMS 264 may be configured to retrieve unprocessed content from unprocessed content datastore 102 or to transmit process content to a processed content datastore 112 upon processing content into a final format that includes processed data and one or more anchor targets and associations between anchor targets and contextual anchors. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more content processing module(s) 266. The content processing module(s) 266 may include a source content processing engine 268 and/or a contextual anchoring processing engine 270.

The content processing module(s) 266 may include computer-executable instructions that, in response to execution by the processor(s) 252, cause operations to be performed including processing unprocessed content received from one or more unprocessed content datastore(s) 102 and transmitting processed content to one or more processed content datastore(s) 112. In some embodiments, the source content processing engine 268 may receive unprocessed content from one or more unprocessed content datastore(s) 102 and may convert the unprocessed content to a different format. For example, the unprocessed content may be in the form of a word processing document or a portable document format (PDF). The unprocessed content may be automatically converted to an intermediate format. In some embodiments, the source content processing engine 268 may extract data from the unprocessed content and process the data into an intermediate format to be used to identify one or more anchor targets. The source content processing engine 268 may present the processed content in the intermediate format to a content producer 110 for review. In some embodiments, the source content processing engine 268 may transmit the processed content in the intermediate format to a content authoring device 108 and the content producer 110 may provide corrections or updates to the processed content. The source content processing engine 268 may receive the corrections or updates to the processed content from the content authoring device 108 or directly from the content product through the content processing server 104 and may correct or update the processed content. The source content processing engine 268 may then transmit the processed content in the intermediate format to the content authoring device 108 for further processing and establishing of anchor targets in the processed content in the intermediate format.

In some embodiments, the source content processing engine 268 may process the unprocessed content to conform to one or more pre-determined templates. The pre-determined templates may be formatted based at least in part for specific devices, screen sizes, type of content, or the like.

The contextual anchoring processing engine 270 may receive data from a contextual anchoring module 246 of a content authoring device 108 establishing one or more anchor targets in the processed content in the intermediate format. The contextual anchoring processing engine 270 may process the data received from the contextual anchoring module 246 and the processed content in the intermediate format and may compile finalized content that includes the anchor targets. For example, in some embodiments, the contextual anchoring processing engine 270 may convert the data received from the contextual anchoring module 246 and the processed content in the intermediate format into a final format, such as an e-book. The contextual anchoring processing engine 270 may then transmit the processed content in the final format to one or more processed content datastore(s) 112 where the content will be available to be transmitted to a user device 114 for use by a user 116.

Within the data storage 254, one or more modules may be stored. As used herein, the term module may refer to a functional collection of instructions that may be executed by the one or more processors 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The content authoring device 108 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from data storage 234 and loaded into memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into memory 236 as needed for execution. Depending on the configuration and implementation of the content authoring device 108, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The content authoring device 108 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The content authoring device 108 may further include network interface(s) 240 that facilitate communication between the content authoring device 108 and other devices of the illustrative system architecture 200 (e.g., content processing server 104 or one or more datastore(s) 102, 112) or application software via the network(s) 204. The content authoring device 108 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like, may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the content authoring device 108 and the hardware resources of the content authoring device 108. More specifically, the O/S 242 may include a set of computer-executable instructions for managing the hardware resources of the content authoring device 108 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more contextual anchoring module(s) 246.

The contextual anchoring module(s) 246 may include computer-executable instructions that in response to execution by the processor(s) 232 cause operations to be performed including receiving processed content in an intermediate format from a content processing server 104. The contextual anchoring module 246 may present the processed content in the intermediate format to a content producer 110 operating the content authoring device 108. The contextual anchoring module 246 may generate or render one or more visual user interface (UI) controls with the processed content in the intermediate format to the content producer 110 to facilitate establishing one or more anchor targets in the processed content. The contextual anchoring module 246 may identify one or more contextual anchor candidates. In some embodiments, the contextual anchoring module 246 may identify the one or more contextual anchor candidates based at least in part on input from the content producer 110. The content producer 110 may provide a word or phrase through a UI generated by the contextual anchoring module 246 or one or more contextual anchor parameters through the one or more visual UI controls. The visual UI controls may include, but are not limited to, a slider, one or more radio buttons, and/or one or more checkboxes. The visual UI controls may specify other contextual anchor candidates within a distance as specified by the visual UI controls. For example, a content producer 110 may specify through a visual UI control, such as a slider, to display all contextual anchor candidates within 50 words of a contextual anchor candidate specified by the content producer 110. The content producer 110 may adjust the distance through the visual UI control so that all contextual anchor candidates within the specified distance may be presented to the user. The contextual anchor candidates may be presented to the user through decorated text, such as through highlighting, underlining, an icon displayed in association with the contextual anchor candidate, or the like.

The contextual anchoring module 246 may receive an indication from a content producer 110 indicating a selection of an anchor target. In some embodiments, the content producer 110 may right click and select a word, phrase, image, table, list, graphic, or the like as the anchor target. The content producer 110 may then specify through the visual UI control to display contextual anchor candidates within a distance from the anchor target. The content producer 110 may then select one or more contextual anchors from the presented contextual anchor candidates to associate with the set anchor target to establish an association with the set anchor target.

The contextual anchoring module 246 may transmit the one or more associations between the set anchor target and the selected one or more contextual anchor to the contextual anchoring processing engine 270 of the content processing server 104 for processing and conversion of the processed content, the set anchor target, and the selected contextual anchor to a final format.

Within the data storage 234, one or more modules may be stored. As used herein, the term module may refer to a functional collection of instructions that may be executed by the one or more processors 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The one or more user device(s) 114 operated by one or more user(s) 116 may include one or more processors (processor(s)) 272 and one or more memories 278 (referred to herein generically as memory 278). The processor(s) 272 may include any suitable processing unit capable of accepting digital data as input, processing the input data based on stored computer-executable instructions, and generating output data. The computer-executable instructions may be stored, for example, in the data storage 274 and may include, among other things, operating system software and application software. The computer-executable instructions may be retrieved from data storage 274 and loaded into memory 278 as needed for execution. The processor(s) 272 may be configured to execute the computer-executable instructions to cause various operations to be performed. The processor(s) 272 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 274 may store program instructions that are loadable and executable by the processor(s) 272, as well as data manipulated and generated by the processor(s) 272 during execution of the program instructions. The program instructions may be loaded into memory 278 as needed for execution. Depending on the configuration and implementation of the user device 114, the memory 278 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 278 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device 114 may further include additional data storage 274 such as removable storage and/or non-removable storage including, but not limited to, magnetic storage, optical disk storage, and/or tape storage. Data storage 274 may provide non-volatile storage of computer-executable instructions and other data. The memory 278 and/or the data storage 274, removable and/or non-removable, are examples of computer-readable storage media (CRSM).

Referring again to the data storage 274, various program modules, applications, or the like, may be stored therein that may comprise computer-executable instructions that when executed by the processor(s) 272 cause various operations to be performed. The memory 278 may have loaded from the data storage 274 one or more operating systems (O/S) that may provide an interface between other application software (e.g., dedicated applications, a browser application, a web-based application, a distributed client-server application, etc.) executing on the user device 114 and the hardware resources of the user device 114. More specifically, the O/S may include a set of computer-executable instructions for managing the hardware resources of the user device 114 and for providing common services to other application programs (e.g., managing memory allocation among various application programs). The O/S may include any operating system now known or which may be developed in the future including, but not limited to, any mobile operating system, desktop or laptop operating system, mainframe operating system, or any other proprietary or open-source operating system.

The data storage 274 may additionally include various other program modules that may include computer-executable instructions for supporting a variety of associated functionality. For example, the data storage 274 may include one or more applications 276 that may be used to receive processed content, such as e-books, from one or more processed content datastore(s) 112. The one or more applications 276 may also be used to present the processed content to the user 116 operating the user device 114.

Those of ordinary skill in the art will appreciate that any of the components of the architecture 200 may include alternate and/or additional hardware, software, or firmware components beyond those described or depicted without departing from the scope of the disclosure. More particularly, it should be appreciated that hardware, software, or firmware components depicted or described as forming part of any of one or more content processing server(s) 104, one or more content authoring device(s) 108, one or more user device(s) 114, one or more unprocessed content datastore(s) 102 and/or one or more processed content datastore(s) 112, and the associated functionality that such components support, are merely illustrative and that some components may not be present or additional components may be provided in various embodiments.

Those of ordinary skill in the art will appreciate that the illustrative architecture 200 depicted in FIG. 2 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 200 depicted in FIG. 2, or additional functionality.

Figure 3A:
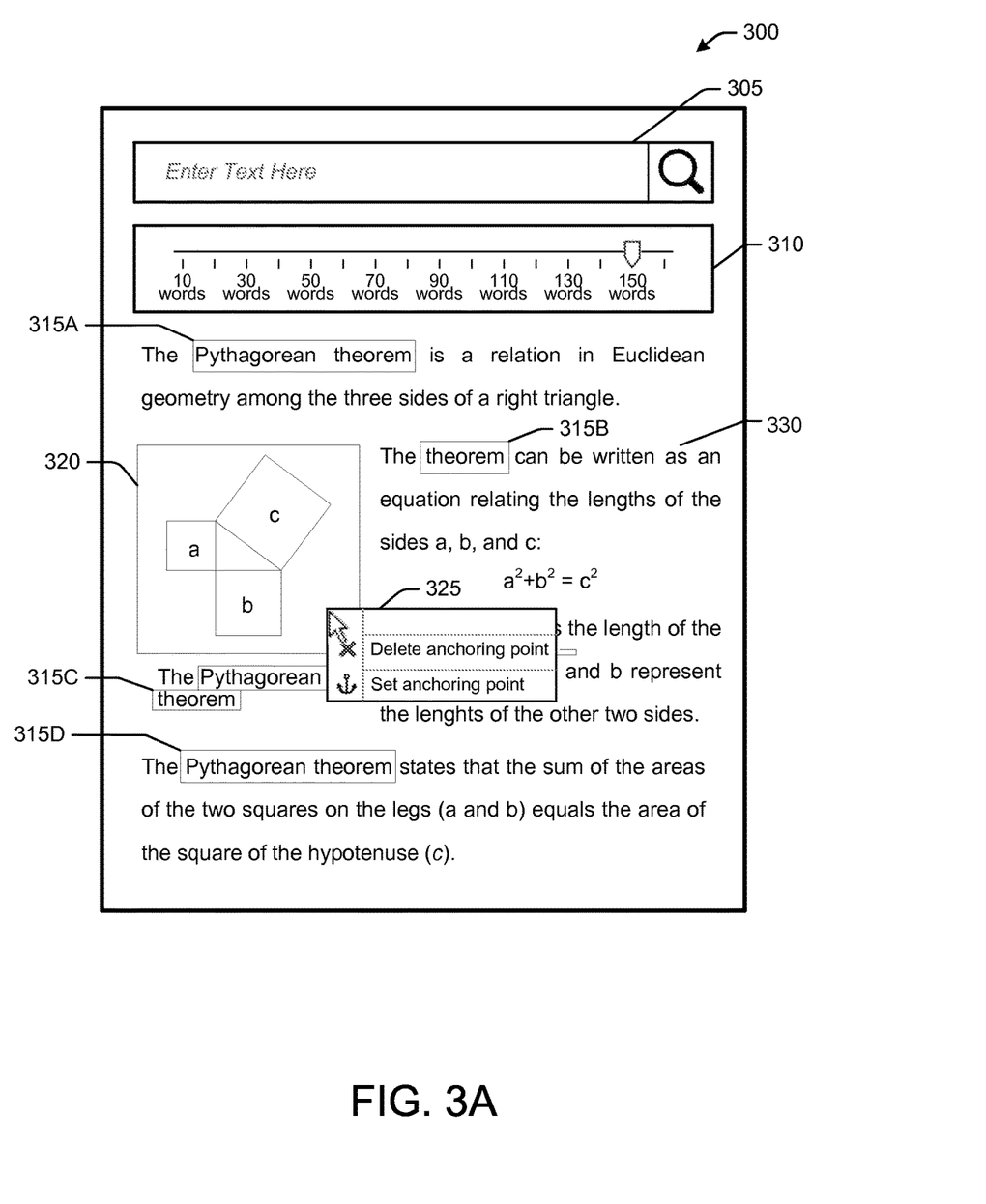
FIGS. 3A-3B illustrate example embodiments of user interfaces for contextual anchor points in content in accordance with one or more embodiments of the disclosure.

FIG. 3A illustrates an example embodiment of a user interface for anchor targets and contextual anchors in content in accordance with one or more embodiments of the disclosure. In some embodiments, the contextual anchoring module 246 of a content authoring device 108 may present processed content 330 in an intermediate format to a content producer 110. The contextual anchoring module 246 may select a word, phrase, image 320, table, list, graphic, or the like and set the selected item as an anchor target. For example, the content producer 110 may right click on an image 320 and a drop down menu 325 may be generated. The drop down menu 325 may include an option to delete a set anchor target and/or an option to set an anchor target.

The contextual anchoring module 246 may render and present one or more visual UI controls, such as a search box 305 and/or a slider 310 to facilitate receiving input of contextual anchor parameters from a content producer 110. A content producer 110 may enter a word or phrase in the search box 305 to direct the contextual anchoring module 246 to identify contextual anchor candidates in the processed content 330. In some embodiments, the content producer 110 may specify a distance from the set anchor target. The distance may be the number of words, sentences, pages, or similar unit from the set anchor target. In some embodiments, the contextual anchoring module 246 may identify one or more contextual anchor candidates based at least in part on data received from a content producer 110. For example, the content producer 110 may have entered "theorem" in the search box 305 and specified a distance of 150 words using the slider 310. The contextual anchoring module 246 may identify one or more contextual anchor candidates 315A-315D based at least in part on the received data. As shown, the contextual anchoring module 246 may decorate the one or more identified contextual anchor candidates 315A-315D by highlighting, underlining, associating an icon, or otherwise visually decorating the identified contextual anchor candidates 315A-315D. The content producer 110 may select one or more contextual anchors from the identified contextual anchor candidates 315A-315D. The contextual anchoring module 246 may receive the selection from the content producer 110 through the rendered UI 300 and establish an association between the set anchor target and the selected one or more contextual anchor 315A-315D.

Figure 3B:
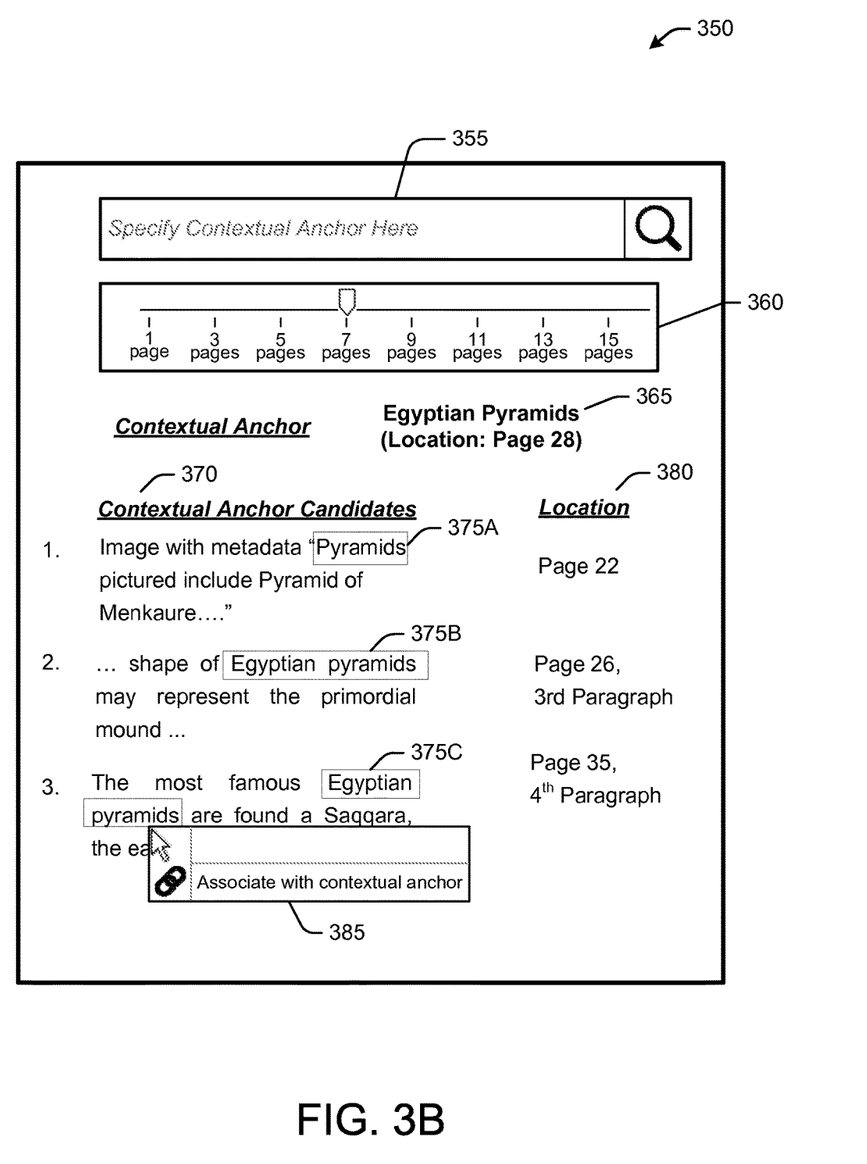

FIG. 3B illustrates an example embodiment of a user interface 350 for anchor targets in content in accordance with one or more embodiments of the disclosure. The contextual anchoring module 246 may render and present one or more visual UI controls, such as a text box 355 and/or a slider 360 to facilitate receiving input of contextual anchor parameters from a content producer 110. In some embodiments, the contextual anchoring module 246 of a content authoring device 108 may receive specification of an anchor target 365 by entering a phrase through a text box 355 rendered by the contextual anchoring module 246. A content producer 110 may enter a word or phrase in the text box 355 to direct the contextual anchoring module 246 to identify contextual anchor candidates in the processed content 330. The contextual anchoring module 246 may identify and present one or more contextual anchor candidates to the content producer 110. The content producer 110 may right click one of the presented contextual anchor candidates and designate it as the anchor target 365. The contextual anchoring module 246 may then display the anchor target 365 and its location on the UI. The content producer 110 may use the slider 360 to indicate a range of pages to search for contextual anchor candidates. In some embodiments, the content producer 110 may use the slider 360 to indicate a range of pages before and after the location of the anchor target 365. For example, in FIG. 3B, the range is shown as 7 pages. The 7 pages may be up to 7 pages before or after the location of the contextual anchor (e.g., page 28). Therefore, the range for the illustrated embodiment is from page 22 to 35 of the content.

The contextual anchoring module 246, in response to the content producer 110 indicating a range via the slider 360, may display two columns. The first column 370 may be short descriptions or snippets of content surrounding the contextual anchor candidates 375A, 375B, 375C. The second column 380 may display the corresponding locations of the items of the first column 370.

In some embodiments, the content producer 110 may right-click on a contextual anchor candidate, such as 375C. In response to the right-click, the contextual anchoring module 246 may generate a drop down menu 385. The drop down menu 385 may include an option to associate the anchor target 365 with a contextual anchor candidate 375C. In response to the content producer 110 selecting the option to associate the anchor target 365 with the contextual anchor candidate 375C, the contextual anchoring module 246 may associate the anchor target 365 with the contextual anchor candidate 375C. In some embodiments, if an association exists between the anchor target 365 with the contextual anchor candidate 375C, the contextual anchoring module 246 may render an option in the drop down menu 385 to delete the association between the anchor target 365 with the contextual anchor candidate 375C.

In some embodiments, the UI generated by the contextual anchoring module 246 may be a part of a dedicated application for anchor targets in content. In other embodiments, the UI may be part of a web interface, where the processing of the content and establishing of associations between anchor targets and contextual anchors selected from the contextual anchor candidates may be completed on a remote server.

Illustrative Processes

Figure 4:
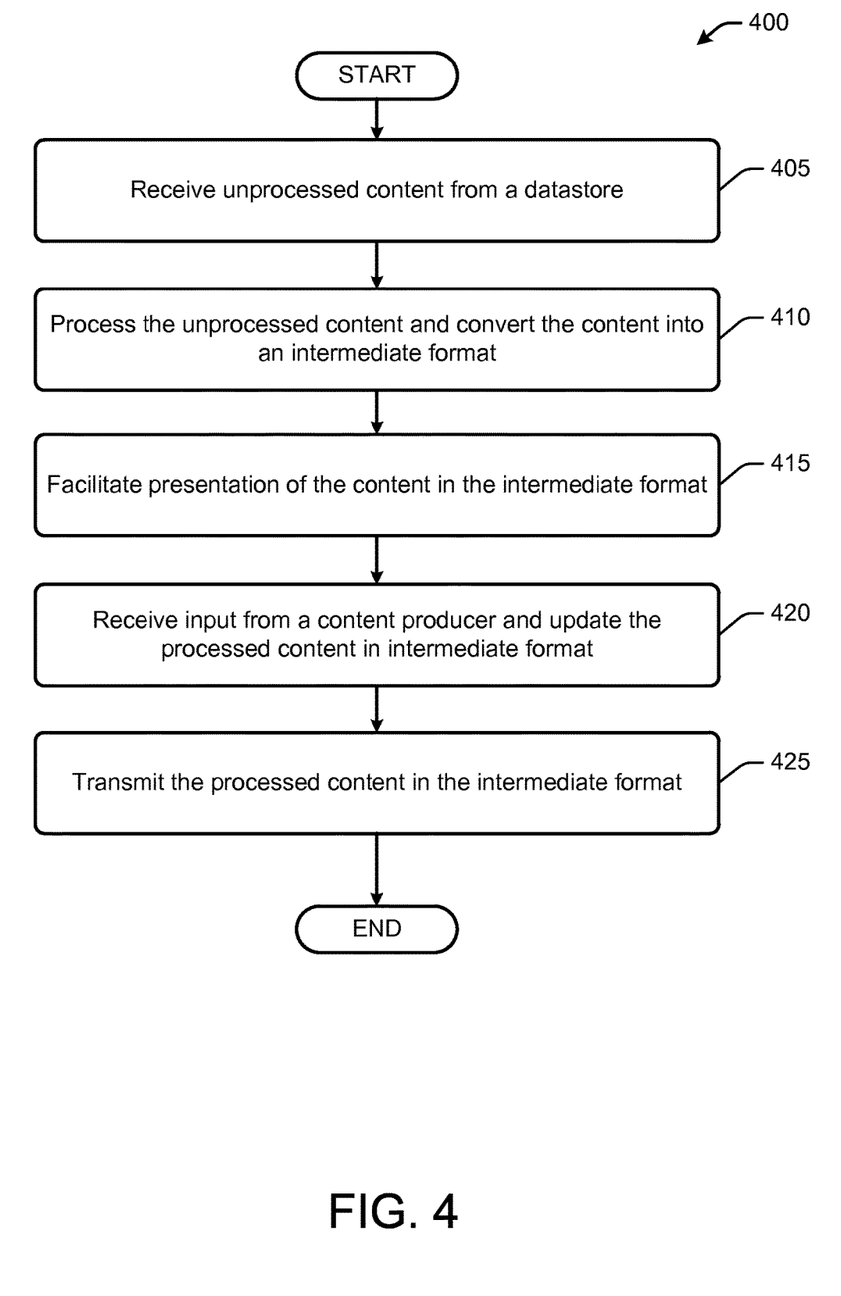
FIG. 4 is a process flow diagram of an illustrative method for contextual anchor points in content in accordance with one or more embodiments of the disclosure.

FIG. 4 is a process flow diagram of an illustrative method 400 for contextual anchor points in content in accordance with one or more embodiments of the disclosure. At block 405, unprocessed content may be received from a datastore, such as the unprocessed content datastore 102. In some embodiments, the unprocessed content may be obtained and/or retrieved by a content processing server 104. The unprocessed content may be in a variety of different forms. For example, the unprocessed content may be a word processing document, a PDF document, an HTML file, a scanned PDF, a scanned image, or the like. In some embodiments, the unprocessed content may be retrieved and/or obtained from the datastore in response to receiving an indication from a content producer 110.

At block 410, the source content processing engine 268 may process the unprocessed content and convert the content into an intermediate format. In some embodiments, the source content processing engine 268 may extract data from the unprocessed content. In some embodiments, the unprocessed content may be in a proprietary format, where the content is not easily accessible by the content processing server 104. For example, the unprocessed content may be in the form of a scanned PDF document. The scanned PDF document may require the source content processing engine 268 to extract data from the scanned PDF document. The source content processing engine 268 may automatically convert the data extracted from the unprocessed content into an intermediate format. The intermediate format may permit the content to be more easily manipulated and/or reviewed by a user.

At block 415, the source content processing engine 268 may facilitate presentation of the processed content in the intermediate format to a user, such as a content producer 110. In some embodiments, the source content processing engine 268 may provide the processed content in the intermediate format to the content producer 110 through a UI rendered by the content processing server 104. In some embodiments, the source content processing engine 268 may provide the processed content in the intermediate format to the content producer 110 by transmitting the content to a content authoring device 108 operated by the content producer 110. In some embodiments, the source content processing engine 268 may provide the content to a web server that displays the processed content through a web interface.

At block 420, the content producer 110 may interact with the presented processed content in the intermediate format and provide input regarding the processed content. For example, the content producer 110 may identify one or more elements or sections of the processed content that requires corrections, updates, and/or re-processing. The source content processing engine 268 may receive the input from the content producer 110 and update or otherwise modify the processed content in the intermediate format based at least in part on the input received from the content producer 110.

At block 425, the content processing module 266 may transmit the processed content in the intermediate format. In some embodiments, the content processing module 266 may transmit the processed content to one or more content authoring device(s) 108 to facilitate establishing one or more anchor targets in the processed content. In some embodiments, the content processing module 266 may transmit the processed content to a datastore for storage until a content authoring device 108 obtains or retrieves the content to further process the content to establish one or more anchor targets.

In some embodiments, the content processing server 104 may receive processed content and additional data from a content authoring device 108. The additional data may include one or more anchor targets and associations between anchor targets and one or more contextual anchor selected from one or more contextual anchor candidates. The content processing server 104 may convert the received processed content into a final format. The final format may ensure that the anchor targets and associated contextual anchors are rendered in proximity to each other, regardless of the type of device, size of screen of the device, or the like. In some embodiments, the final format may be a proprietary format for specific devices and/or software. In some embodiments, the final format may be a format that is compatible with multiple devices and/or applications. The content processing server 104 may transmit the processed content in the final format to a datastore, such as a processed content datastore 112.

In some embodiments, the content processing server 104 may apply one or more pre-determined templates to the processed content. The pre-determined templates may be formatted based at least in part for specific devices, screen sizes, type of content, or the like. In some embodiments, the pre-determined templates may be generated based on data received from a content producer 110. In some embodiments, the pre-determined templates may be generated by another entity. The content processing server 104 may generate different versions of the processed content based at least in part on different pre-determined templates. For example, the content processing server 104 may generate a version of an e-book with anchor targets for a smartphone, which may be different than a version of the e-book with anchor targets for a tablet.

The different versions of the processed content may be stored in a datastore, such as a processed content datastore 112. One or more user devices 114 may obtain or otherwise receive the processed content in the final format from the processed content datastore 112. In some embodiments, the user device 114 may obtain the processed content from the processed content datastore 112 through an e-commerce website, digital media store, or the like.

Figure 5:
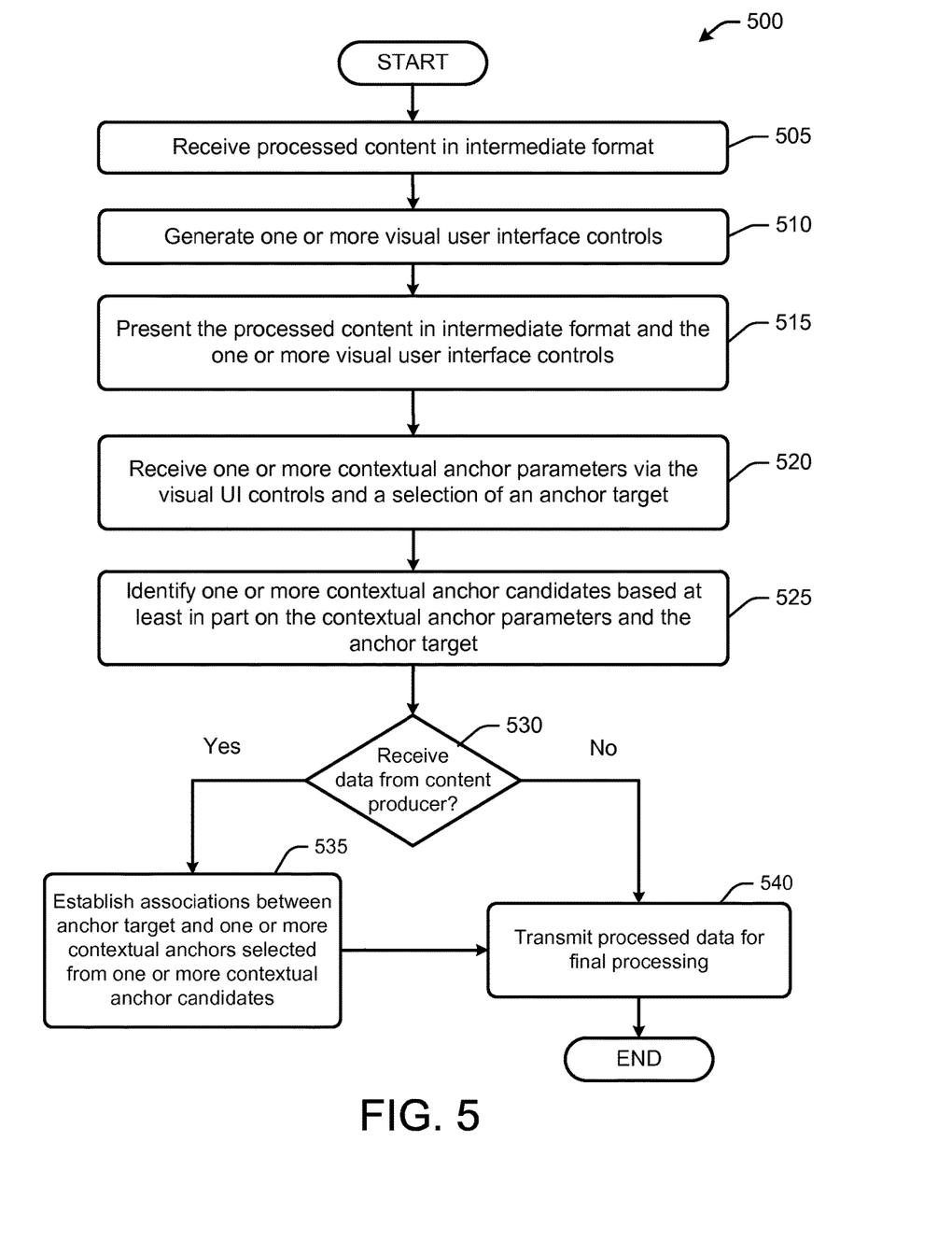
FIG. 5 is a process flow diagram of an illustrative method for contextual anchor points in content in accordance with one or more embodiments of the disclosure.

FIG. 5 is a process flow diagram of an illustrative method 500 for contextual anchor points in content in accordance with one or more embodiments of the disclosure. At block 505, the contextual anchoring module 246 may receive processed content in the intermediate format. In some embodiments, the contextual anchoring module 246 may receive the processed content from a content processing server 104 or a datastore.

At block 510, the contextual anchoring module 246 of the content authoring device 108 may generate one or more visual user interface (UI) controls. The visual UI controls may be used by a user, such as a content producer 110, to specify one or more contextual anchor parameters, such as a distance to be used by the contextual anchoring module 246 to identify contextual anchor candidates from the anchor target. In some embodiments, the UI controls may include, but are not limited to, sliders, radio buttons, checkboxes, and the like. In some embodiments, the contextual anchoring module 246 may provide a heuristic-based proximity tool in conjunction with the visual UI controls. At block 515, the contextual anchoring module 246 may present the processed content in the intermediate format and the one or more visual UI controls to the content producer 110 operating the content authoring device 108.

At block 520, the contextual anchoring module 246 may receive one or more contextual anchor parameters via the visual UI controls and a selection of an anchor target in the processed content. The content producer 110 may specify one or more contextual anchor parameters, such as distance from the anchor target, through the visual UI controls. The content producer 110 may select the anchor target by selecting an element in the processed content, such as an image, word, phrase, table, list, or graphic. In some embodiments, the content producer 110 may right click on the element and select the option to set the element as an anchor target. The anchor target and the contextual anchor parameters may be transmitted to the contextual anchoring module 246 of the content authoring device 108. In some embodiments, the content producer 110 may associate an identifier, such as a string of letters, with the anchor target to help identify the anchor target in the context of the processed content. In some embodiments, the contextual anchoring module 246 may associate a visual indicator, such as a color, with the anchor target.

At block 525, the contextual anchoring module 246 may identify one or more contextual anchor candidates based at least in part on the contextual anchor parameters and the anchor target. The contextual anchoring module 246 may present the contextual anchor candidates using the visual indicator associated with the anchor target to enable the content producer 110 to easily identify those contextual anchor candidates associated with the anchor target. In some embodiments, the contextual anchoring module 246 may identify or determine contextual anchor candidates that may be related to the anchor target. For example, the contextual anchoring module 246 may identify or determine contextual anchor candidates that appear similar or related based at least in part on a resource, such as a pre-determined list, dictionary, or other similar tool.

At block 530, contextual anchoring module 246 may determine whether the content producer 110 selected any anchor targets. If the content producer 110 did not select any anchor targets, the method may proceed to block 540. If the content producer 110 did select an anchor target, the method may proceed to block 535.

At block 535, the contextual anchoring module 246 may establish an association between the anchor target and one or more contextual anchors selected from the identified or determined contextual anchor candidates. The association may be used to indicate that the anchor target and the one or more selected contextual anchors should be displayed in proximity to each other when rendered by a user device 114.

At block 540, the contextual anchoring module 246 may transmit the processed data for final processing. In some embodiments, the contextual anchoring module 246 may transmit the processed data, anchor targets, and/or associations between the anchor targets and the one or more contextual anchors to a content processing server 104 for processing into a final format. In some embodiments, the contextual anchoring module 246 may transmit the processed content and additional data (e.g., associations, anchor targets, contextual anchors, etc.) to a datastore for storage until the content and/or additional data are retrieved for final processing.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   receiving processed content from a server, wherein the processed content comprises text;
   receiving one or more contextual anchor parameters from a user device, wherein the one or more contextual anchor parameters are selected using one or more visual user interface controls;
   receiving a selection of an anchor target in the processed content from the user device;
   identifying a plurality of contextual anchor candidates in the processed content based at least in part on the anchor target and the one or more contextual anchor parameters, wherein each of the plurality of contextual anchor candidates comprises an element that is associated with the anchor target and wherein one of the one or more contextual anchor parameters is a range of pages and the plurality of contextual anchor candidates are located within the range of pages before and after the anchor target;
   causing display of the plurality of contextual anchor candidates and at least a portion of the processed content with a visual indicator associated with the anchor target;
   receiving a selection of a contextual anchor from the plurality of contextual anchor candidates from the user device;
   establishing an association between the anchor target and the contextual anchor, wherein the association is used to render the anchor target and the contextual anchor within a pre-determined distance in the processed content; and
   transmitting the processed content, the anchor target, and the association.

2. The computer-readable medium of claim 1, wherein the one or more visual user interface controls comprise one or more sliders, one or more radio buttons, or one or more checkboxes.

3. The computer-readable medium of claim 1, wherein transmitting the processed content, the anchor target, and the association further comprises transmitting the processed content, the anchor target, and the association to the server for conversion of the processed content into a final format.

4. The computer-readable medium of claim 3, wherein the conversion of the processed content into the final format further comprises applying a template to the processed content.

5. A computer-implemented method comprising:
   receiving, by a system comprising one or more computers comprising one or more processors, content from a server;
   receiving, by the system, a contextual anchor parameter from a user device, wherein the contextual anchor parameter is selected using a visual user interface control;
   receiving, by the system, a selection of an anchor target in the content;
   identifying, by the system, a plurality of contextual anchor candidates in the content based at least in part on the anchor target and the contextual anchor parameter, wherein each of the plurality of contextual anchor candidates comprises an element that is associated with the anchor target and wherein the contextual anchor parameter is a range of pages and the plurality of contextual anchor candidates are located within the range of pages before and after the anchor target;
   receiving, by the system, a selection of a contextual anchor from the plurality of contextual anchor candidates from the user device;
   establishing, by the system, an association between the anchor target and the contextual anchor, wherein the association will be used to render the anchor target and the contextual anchor within a pre-determined distance in the processed content; and
   storing, by the system, the association.

6. The computer-implemented method of claim 5, further comprising:
   receiving, by the system, the contextual anchor parameter from the user, wherein the contextual anchor parameter is a distance in the content.

7. The computer-implemented method of claim 5, wherein the visual user interface control is one of a slider, a radio button, or a checkbox.

8. The computer-implemented method of claim 5, further comprising:
   displaying, by the system, the contextual anchor candidate and at least a portion of the content to a user within a predetermined distance from the anchor target.

9. The computer-implemented method of claim 5, wherein the anchor target comprises at least one word, a phrase, an image, a table, a list, or a graphic.

10. The computer-implemented method of claim 5, further comprising transmitting the content, the anchor target, and the association to the server for conversion of the content into a final format.

11. The computer-implemented method of claim 10, wherein the conversion of the content into the final format comprises applying a template to the content.

12. The computer-implemented method of claim 5, further comprising:
   decorating, by the system, the contextual anchor candidate, wherein the decorating comprises applying a color, applying an underline, applying italics, or associating an icon with the contextual anchor candidate.

13. A system comprising:
   at least one memory storing computer-executable instructions; and at least one processor, wherein the at least one processor is configured to access the at least one memory and to execute the computer-executable instructions to:

receive content from a datastore;

process the content, wherein to process the content comprises converting the content into an intermediate format;

generate one or more visual user interface controls to present with the content to facilitate presentation of the content in the intermediate format to a user device, wherein the one or more visual user interface controls is used to obtain a contextual anchor parameter, wherein the contextual anchor parameter is a range of pages and a contextual anchor candidate is located within the range of pages before and after an anchor target;

modify the content in the intermediate format based at least in part on input received from the user device, wherein the input received from the user device indicates the anchor target and an association with a contextual anchor; and transmit the content in the intermediate format to a computing device for further processing, wherein the anchor target and the contextual anchor are rendered within a pre-determined distance in the content based on the association.

14. The system of claim 13, wherein the content is one of a word processing document, a portable document format (PDF) document, a text document, a scanned image, or an HTML file.

15. The system of claim 13, wherein the at least one processor is further configured to execute the computer-executable instructions to:

extract data from the content.

16. The system of claim 13, wherein the at least one processor is further configured to execute the computer-executable instructions to:

receive input from the user, wherein the input comprises a correction, a modification, or instructions to re-process at least a portion of the content.

17. The system of claim 13, wherein, to transmit the content in the intermediate format, the at least one processor is further configured to execute the computer-executable instructions to:

transmit the content in the intermediate format to the datastore or the computing device to establish the anchor target in the content.

18. The system of claim 13, wherein the at least one processor is further configured to execute the computer-executable instructions to:

receive, from the computing device, the processed content, the anchor target, and the association between the anchor target and the contextual anchor.

19. The system of claim 18, wherein the at least one processor is further configured to execute the computer-executable instructions to:

apply one or more templates to the processed content, wherein the templates include instructions for the anchor target to be rendered in proximity with the contextual anchor.

20. The system of claim 19, wherein the at least one processor is further configured to execute the computer-executable instructions to:

convert the content, the anchor target, and the association between the anchor target and the contextual anchor into a final format.

* * * * *